(12) United States Patent
Yamaguchi et al.

(10) Patent No.: US 8,328,418 B2
(45) Date of Patent: Dec. 11, 2012

(54) PROCESS FOR MANUFACTURING PLATINUM RESISTANCE THERMOMETER

(75) Inventors: Toru Yamaguchi, Tokyo (JP); Hideo Kimura, Osaka (JP); Kazuya Yoneshita, Osaka (JP)

(73) Assignee: Azbil Corporation, Tokyo (JP)

( * ) Notice: Subject to any disclaimer, the term of this patent is extended or adjusted under 35 U.S.C. 154(b) by 596 days.

(21) Appl. No.: 12/600,436

(22) PCT Filed: May 19, 2008

(86) PCT No.: PCT/JP2008/059156
§ 371 (c)(1),
(2), (4) Date: Nov. 16, 2009

(87) PCT Pub. No.: WO2008/143221
PCT Pub. Date: Nov. 27, 2008

(65) Prior Publication Data
US 2010/0150204 A1    Jun. 17, 2010

(30) Foreign Application Priority Data
May 18, 2007  (JP) .................................. 2007-133383

(51) Int. Cl.
*G01K 1/00* (2006.01)
(52) U.S. Cl. ...................... 374/100; 374/185; 427/557
(58) Field of Classification Search .............. 374/100, 374/185, 208; 427/557, 126.5, 252
See application file for complete search history.

(56) References Cited

U.S. PATENT DOCUMENTS

| | | | |
|---|---|---|---|
| 4,469,717 A * | 9/1984 | Baxter et al. ............ | 374/E7.022 |
| 4,627,902 A * | 12/1986 | Johnston et al. .............. | 374/185 |
| 4,719,442 A * | 1/1988 | Bohara et al. ........... | 374/E7.022 |
| 4,795,884 A * | 1/1989 | Carroll .......................... | 374/183 |
| 4,805,296 A * | 2/1989 | Jinda et al. .............. | 374/E7.022 |
| 4,901,051 A * | 2/1990 | Murata et al. .............. | 374/E7.021 |
| 4,906,965 A * | 3/1990 | Murata et al. .............. | 374/E7.021 |
| 5,089,293 A * | 2/1992 | Bohara et al. ........... | 374/E7.022 |
| 6,004,471 A * | 12/1999 | Chuang ......................... | 374/114 |
| 6,127,915 A * | 10/2000 | Gam et al. ..................... | 374/185 |
| 6,437,681 B1 * | 8/2002 | Wang et al. ............. | 374/E7.022 |
| 2002/0189342 A1 * | 12/2002 | Ishiguro et al. ............ | 73/204.26 |
| 2010/0150204 A1 * | 6/2010 | Yamaguchi et al. .......... | 374/100 |
| 2010/0151148 A1 * | 6/2010 | Kimura et al. ................ | 427/557 |

FOREIGN PATENT DOCUMENTS

| | | |
|---|---|---|
| JP | 02-121302 A | 5/1990 |
| JP | 07-201521 A | 8/1995 |
| JP | 2001-291607 A | 10/2001 |
| JP | 2001-296186 A | 10/2001 |
| JP | 2001-343291 A | 12/2001 |

* cited by examiner

Primary Examiner — Yaritza Guadalupe-McCall
(74) Attorney, Agent, or Firm — Troutman Sanders LLP (57) ABSTRACT

A process for manufacturing a platinum resistance thermometer that is stable with reduced resistance value variation over service temperature range through clarification of a quantitative mechanism of resistance value variation with respect to the oxidation/reduction of platinum resistance wire. The process including the steps of (S1) enclosing a purge gas containing an inert gas and oxygen in a protection tube provided with a thermosensitive part of platinum resistance wire; (S2) raising the internal temperature of the protection tube to a temperature region in which the platinum is in reduced form at a partial pressure of oxygen in the purge gas as determined from platinum oxide formation free energy; (S3) replacing the purge gas with an inert gas wherein oxygen is 1 kPa or below; and (S4) sealing the protection tube under the replaced condition.

10 Claims, 7 Drawing Sheets

PROCESS FOR MANUFACTURING PLATINUM RESISTANCE THERMOMETER

CROSS REFERENCE TO RELATED APPLICATION

This is the U.S. national phase application under 35 U.S.C. §371 of International Patent Application No. PCT/JP2008/059156 filed May 19, 2008 and claims the benefit of Japanese Application No. 2007-133383, filed May 18, 2007. The International Application was published on Nov. 27, 2008 as International Publication No. WO/2008/143221 under PCT Article 21(2) the contents of these applications are incorporated herein in their entirety.

FIELD OF TECHNOLOGY

The present invention relates to a manufacturing process in which a platinum resistance thermometer can be configured to have less resistance value variation and extremely stable characteristics by optimization of the oxygen concentration in purge gas within the protective tube (sheath) and of the temperature of such processes as annealing.

BACKGROUND OF THE INVENTION

Figure 13:
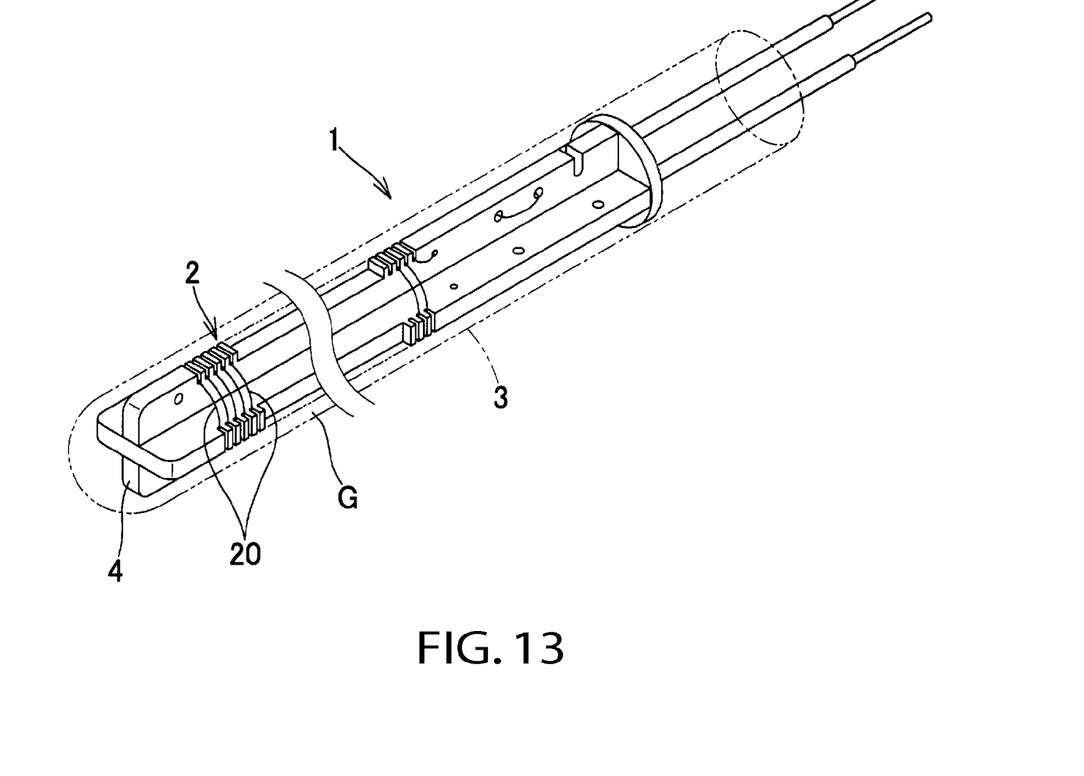
FIG. 13 is a schematic diagram indicating a conventional platinum resistance thermometer.

Standard platinum resistance thermometers have been used for 50 years as secondary thermometers for determining temperature from standard resistance values in research on temperature standards and in the International Temperature Scale (ITS-90) that require reproducibility and precision of under 0.001° C. FIG. 13 indicates the basic structure of a conventional standard platinum resistance thermometer 1 described in Japan Unexamined Patent Publication No. 2001-343291. Normally, in order to prevent contamination of a highly pure platinum wire 20 that composes a thermosensitive part 2, a gas impermeable protective tube 3 made of quartz, sapphire or the like is used, and purging inside this protective tube 3 is conducted with a mixed gas to which oxygen is intentionally added, for example, argon 85%-oxygen 15%. The small amount of oxygen in this purge gas G is present in order to protect the platinum wire 20 of the thermosensitive part 2 from contamination, and there is no clear standard for the amount, which is determined based on past experience and varies for each manufacturer.

Nonetheless, by adding this oxygen, oxidation of the platinum resistance wire by the oxygen in the purge gas causes the resistance value at temperatures of 300° C. to 500° C. to gradually increase, and variations equivalent to 0.001° C. (1 mK) or more occur. Moreover, when exceeding 600° C., the resistance value variations caused by this oxidation is reversed and the resistance value returns to prior to oxidation. Consequently, if a standard platinum resistance thermometer is used to straddle these two temperature regions, the resistance value of the platinum wire gradually increases and is unstable in the temperature region of 300° C. to 500° C., and then the increased portion of the resistance value is eliminated in the temperature region of 600° C. or more, resulting in the problem that there is no reproducibility in the relationship between the resistance value and the temperature when used again in the temperature region of 300° C. to 500° C.

As a conventional countermeasure, rather than use a standard platinum resistance thermometer in the aforementioned two regions, use was divided between platinum resistance thermometers specific to each temperature region, and maintenance was conducted in accordance to the use conditions (re-annealing and the like) for each thermometer while confirming the characteristics (resistance value drift). These countermeasures were taken because the mechanisms of quantitative resistance value variation by oxidation-reduction of the platinum resistance wire were not understood, and there was a lack of knowledge about changes of platinum resistance wire caused by the oxygen concentration in the purge gas when manufacturing standard platinum resistance thermometers. The above problems are not limited to standard platinum resistance thermometers, but are the same for quasi-standard and industrial ones as well, and the uncertainty caused by oxidation of the platinum has not been discussed in the field of temperature measurements using platinum resistance thermometers and has been virtually ignored in the ITS-90 interpolation formulae in the field of platinum resistance thermometers. The affects of oxidation resistance values cannot be ignored in precision temperature measurements.

SUMMARY OF THE INVENTION

In view of the previously described circumstances, in an attempt at resolution, the point of the present invention is to demonstrate the mechanisms of quantitative resistance value variation by oxidation-reduction of the platinum resistance wire, and to offer a manufacturing process to obtain a stable platinum resistance thermometer with less resistance value variation in the temperature region of use.

As a result of assiduous studies related to the present invention in order to resolve the previously described problems, knowledge was obtained regarding the relationship between the variations of platinum resistance thermometer resistance values and oxidation potential phase charts, and the following mechanism regarding quantitative resistance value variation by oxidation-reduction of platinum resistance thermometer resistance wire was demonstrated.

BRIEF DESCRIPTION OF THE DRAWINGS

NOTE: FIG. 13 should be marked as "PRIOR ART".

DETAILED DESCRIPTION OF THE INVENTION

Figure 1:
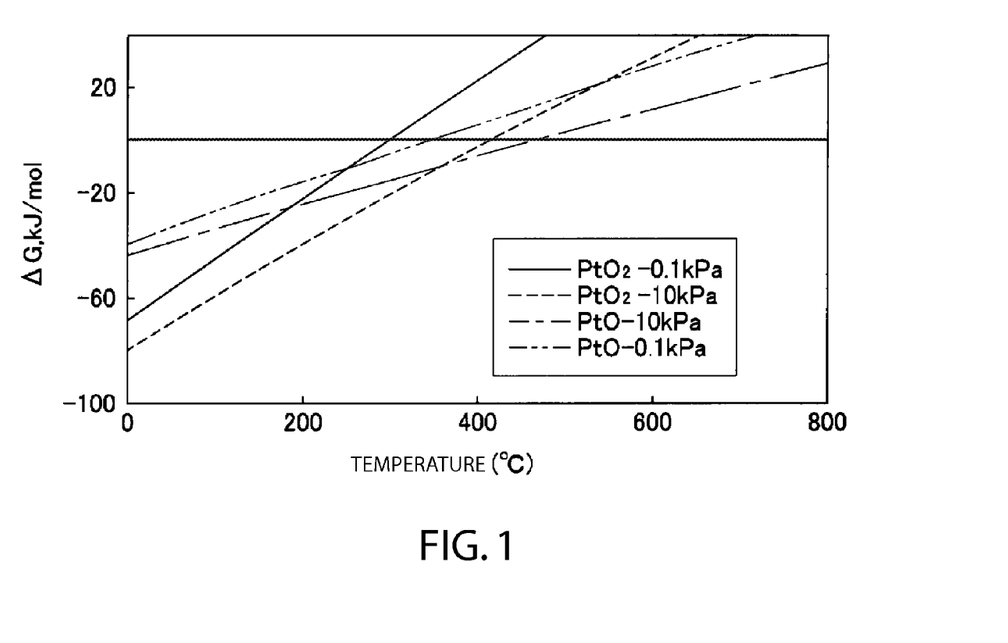
FIG. 1 is an oxidation potential phase chart in which the platinum oxide formation free energies at partial pressures of 0.1 kPa and 10 kPa of oxygen have been calculated.

FIG. 1 is an oxidation potential phase chart relating to the oxidation of platinum, which is calculated by the oxide formation free energy (Gibbs free energy) of the platinum oxides $PtO_2$ and PtO in oxidation reactions when the oxygen partial pressures were 0.1 kPa and 10 kPa. These calculations were made using the Chemical Reaction and Equilibrium Software with Extensive Thermochemical Database, Outokumpu HSC Chemistry for Window, Ver. 5.0. Platinum oxides also include $Pt_3O_4$ and the like, but of this type of platinum oxide may be omitted because the oxide formation free energy is sufficiently larger than that of $PtO_2$ and PtO and has no direct affect on the various of platinum resistance thermometer resistance values. The oxidation potential phase chart of FIG. 1 indicates an energy balance wherein $PtO_2$ is formed in the equilibrium state at a temperature in which the platinum in the oxidation environment is in the vicinity of 300° C., and PtO is formed at a temperature higher than that. These chemical phase transitions demonstrate that the resistance of platinum wire changes at these temperature vicinities. If this oxide film is limited to the surface of the platinum wire, it may be inferred that the resistance change is smaller than the change of resistance value in the equilibrium state.

In the past it was said that the oxygen in the purge gas that is sealed in the sheath of the platinum resistance thermometer is necessary to protect the platinum wire from contamination by other metallic impurities, and oxygen with a partial pressure of about 5 kPa at room temperature was put into the platinum resistance thermometer sheath. According to the oxidation potential phase chart in FIG. 1, $PtO_2$ in the equilibrium state at room temperature changes to PtO at 300° C. to 450° C., and is reduced to platinum and oxygen at temperatures above that. The characteristics of the equilibrium state of the aggregate of platinum and oxygen are determined by the oxide formation free energy, and the oxide formation free energy is determined by the temperature t and the oxygen partial pressure p. The partial pressure of oxygen within the platinum resistance thermometer is normally adjusted to approximately 10 kPa or less, and the oxidation characteristics of most platinum resistance thermometers are between the two partial pressure lines in this chart.

The $PtO_2$ chemical reaction is indicated in equation (1) below. Moreover, the oxide formation free energy $\Delta G_{PtO2}(T,p)$ of this reaction is expressed by equation (2) below. Here, p is the oxygen partial pressure; $K_{PtO2}(T)$ is the chemical equilibrium constant at temperature T; and R is the gas constant. This equation indicates that $PtO_2$ is stable in the temperature region of $\Delta G_{PtO2}(T,p)<0$, and that as long as oxygen is supplied, the chemical reaction always advances to the right in reaction equation (1). Moreover, at approximately 400° C. or more, there is another phase transition, and the chemical reaction of PtO is indicated in equation (3) below. The oxide formation free energy $\Delta G_{PtO}(T,p)$ of this reaction is expressed by equation (4) below. This reaction also depends on the partial pressure p and the temperature T. The direction of this reaction is also determined by the the sign of $\Delta G_{PtO}(T,p)$. At approximately 500° C. or more, $\Delta G_{PtO}(T,p)$ becomes >0, and PTO decomposes into Pt and $O_2$.

$$Pt+O_2=PtO_2 \tag{1}$$

$$\Delta G_{PtO2}(T,p)=-RT\ln(K_{PtO2}(T)/p) \tag{2}$$

$$Pt+\tfrac{1}{2}O_2=PtO \tag{3}$$

$$\Delta G_{PtO}(T,p)=-RT\ln(K_{PtO}(T)/p^{1/2}) \tag{4}$$

Moreover, at 300° C. or less, the above reactions are determined by the sizes of $\Delta G_{PtO2}(T,p)$ and $\Delta G_{PtO}(T,p)$, and if $\Delta G_{PtO2}(T,p)$ is smaller than $\Delta G_{PtO}(T,p)$, then $PtO_2$ is stable. Therefore, PtO is stable in the narrow temperature region in the vicinity of 400° C. Specifically, only in the temperature region from the part that crosses the $PtO_2$ line in FIG. 1 to $\Delta G_{PtO}(T,p)=0$. In the equilibrium state, enclosing approximately 10 kPa of oxygen gas should contribute to a resistance value increase of about 1/10K, but because the velocity of equilibration is extremely slow at room temperature and it may be inferred that an oxide film on the surface of the platinum wire limits diffusion of oxidation to the interior, the actual increase in resistance value does not reach the resistance value in the equilibrium state. Nonetheless, the platinum oxide increases over time and is measured as resistance value drift. Moreover, this oxide reaction velocity becomes faster at high temperatures. Therefore, resistance value drift causes inaccuracy when taking precise measurements, specifically, the measurements must be considered inaccurate at 300° C. or more.

The oxide formation free energy indicated in FIG. 1 indicates that the oxidation-reduction reactions of platinum are controlled depending on the oxygen partial pressure and the temperature. Phase change occurs at the point where the 2 curves of a given partial pressure cross, and if the platinum resistance thermometer is in the equilibrium state, resistance change may be inferred based on these curves. The present inventors conducted experiments to investigate the characteristics (resistance value changes) of oxidation-reduction of platinum wire caused by oxygen in the purge gas, and confirmed by actual measurements when not in the equilibrium state that oxidation-reduction reactions are generated following the oxide formation free energy lines in the oxidation potential phase chart of FIG. 1, and that the resistance value of the platinum resistance thermometer changes.

The platinum resistance thermometer actually used in the experiment was the same as the conventional platinum resistance thermometer indicated in FIG. 13, which had a structure in which platinum wire was wound in a single coil shape on a quartz reel in a quartz sheath, and which was modified so that the oxygen partial pressure in the sheath could be adjusted. Three platinum resistance thermometers were used in the experiment, and these were maintained at a temperature of 600° C. or more for approximately 10 hours to cause reduction of the platinum wire in the thermosensitive part. The partial pressures of the oxygen in the purge gas of the respective platinum resistance thermometers were set at roughly 2 kPa (Y002), 2 kPa (Y003), and roughly 8 kPa (S4742); these were heated from 16 to 24 hours at suitable temperatures from 200° C. to 500° C., and 600° C.; and the resistance value at the triple point of water was measured every 8 hours.

Figure 2:
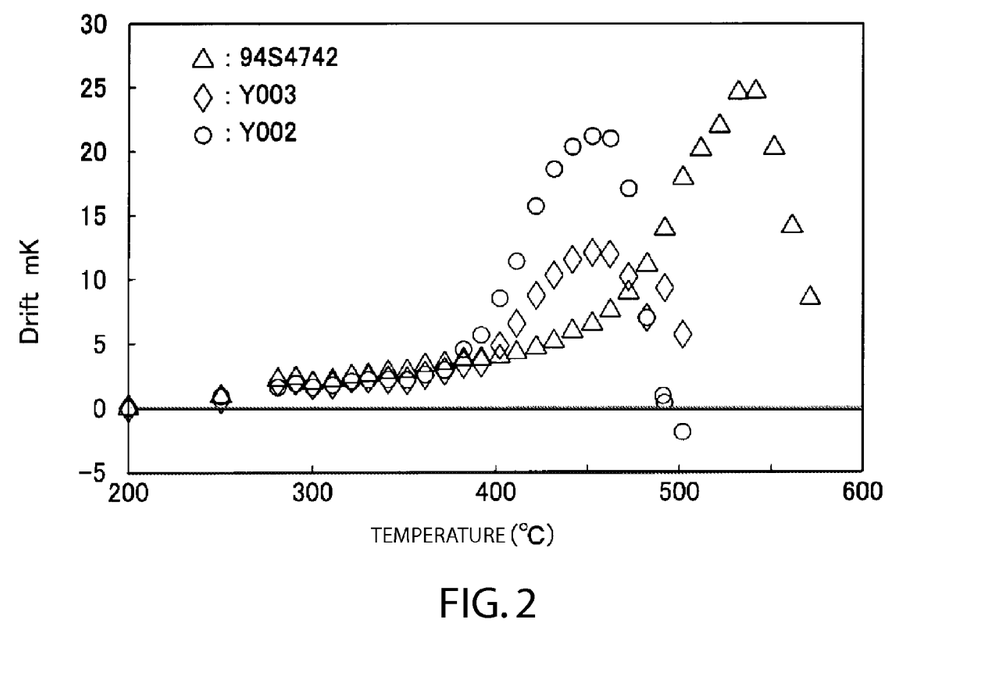
FIG. 2 is a graph of measurements of the amount of resistance value drift of platinum resistance thermometers with resistance caused by oxidation-reduction at a given temperature.

FIG. 2 is a graph of measurements of the amount of drift of the resistance values (not the heat equilibrium state) of platinum resistance thermometers caused by oxidation-reduction at a given temperature for each platinum resistance thermometer, and the transverse axis indicates the exposure temperature while the longitudinal axis is the temperature-converted value of the change of resistance value from when reduced. It was demonstrated that the resistance value separated into 2 phases at a temperature of approximately 350° C. to 400° C., and that the phase transitioned from $PtO_2$ to PtO. Specifically, when an oxidation potential phase chart like that of FIG. 1 is plotted, the oxygen partial pressures of the various platinum resistance thermometers at the two oxidation phases of platinum correspond to both sides of the intersection point of the two intersecting curves. Moreover, it was demonstrated that the resistance value decreased at approximately 450° C. to 530° C., and the phase transitioned from PtO to Pt. When an oxidation potential phase chart like that of FIG. 1 is plotted in the same way, the oxygen partial pressures of the various platinum resistance thermometers correspond to both sides of the intersection point of the PtO curve and the energy 0 line. According to FIG. 2, there two steps in the resistance change of the various platinum resistance thermometers, and the characteristic difference between these platinum resistance thermometers is mainly the oxygen partial pressure.

These experiments confirm that even in the actual measurement environment, which is not an equilibrium state, platinum reacts with oxygen in accordance with the oxidation potential phase chart in FIG. 1. Specifically, it was confirmed that the reaction from platinum to $PtO_2$, from $PtO_2$ to PtO, and from PtO to Pt occur following the oxide formation free energy lines of FIG. 1, and the characteristics of resistance value variations are affected by the oxygen partial pressure in the sheath. The reasons that the resistance value increases appear to be that the number of conduction electrons of the platinum is decreased by $PtO_2$ chemically changing to 2PtO, and that the temperature increase causes acceleration of the chemical change.

Figure 3:
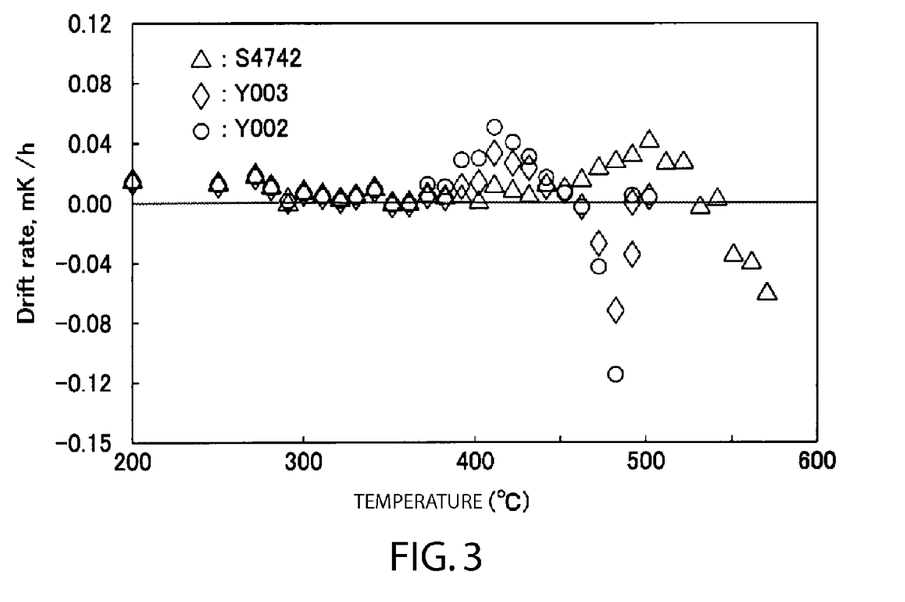
FIG. 3 is a graph indicating the amount of initial drift variation caused by oxidation-reduction at 200° C. to 570° C.

FIG. 3 indicates the change of initial drift caused by the oxidation-reduction from 200° C. to 570° C. that was experimentally obtained, and the longitudinal axis indicates the standard uncertainty of the drift rate at specific temperatures. The drift rate is slow in the $PtO_2$ region and is fast in the PtO region. Therefore it appears that the oxidation in the PtO temperature region is faster than in the $PtO_2$ temperature region. Moreover, the chart indicates that oxidation is already progressing even at 200° C. or less.

Based on the findings that the oxygen in the purge gas and the platinum wire in the platinum resistance thermometer react according to the oxidation potential phase chart of platinum as described above and that the characteristics of the resistance value variations are determined by the partial pressure of the oxygen in the purge gas, the present inventors discovered as a result of repeated experiments and studies under various conditions that, by adjusting the oxygen in the purge gas to a partial pressure of 1 kPa or less once having been annealed by raising the internal temperature up to the reduction temperature of platinum, a platinum resistance thermometer extremely stable across the entire temperature region can be realized; and further discovered that by causing sufficient oxidation of the surface of the platinum by $PtO_2$, if at a partial pressure at which the amount of oxygen in the purge gas becomes the above $PtO_2$ oxidized form in the temperature region of use, a platinum resistance thermometer can be realized, which can be used stably in the applicable temperature region of use without necessarily restricting the partial pressure to 1 kPa. Thus, the present invention was perfected.

Specifically, the present invention offers a process for manufacturing a platinum resistance thermometer provided with a thermosensitive part composed of platinum resistance wire or platinum resistance film in a protective tube, wherein after enclosing a purge gas containing an inert gas and oxygen in the protective tube provided with the thermosensitive part composed of platinum resistance wire or platinum resistance film and raising the temperature inside the protective tube to temperature region in which the platinum is in reduced form at a partial pressure of oxygen in the aforementioned purge gas as determined from platinum oxide formation free energy, the aforementioned purge gas is substituted with inert gas in which oxygen is 1 kPa or less. Further, in the present application, the oxygen partial pressure of the purge gas is the partial pressure at room temperature.

Here, preferably, by sealing the aforementioned protective tube in the state with the aforementioned inert gas having been substituted, the platinum resistance thermometer can be stably used to a temperature region in which the platinum is in reduced form at a partial pressure of oxygen in the purge gas at 1 kPa or less as determined from platinum oxide formation free energy.

Or, preferably, with the purge gas having been substituted with the aforementioned inert gas, after the internal temperature of the protective tube has been lowered to the temperature region of the oxidized form of $PtO_2$, which is derived from the platinum oxide formation free energy with the partial pressure of the oxygen in the aforementioned purge gas at 1 kPa or less, by taking a gas containing oxygen as the aforementioned purge gas, causing sufficient $PtO_2$ oxidation of the surface of the aforementioned platinum resistance wire or platinum resistance film, and sealing the aforementioned protective tube with the partial pressure of the oxygen in the aforementioned purge gas adjusted to a partial pressure such that the use temperature region of the applicable platinum resistance thermometer falls within the temperature region of the aforementioned oxidized form of $PtO_2$ (a temperature lower than the temperature at which PtO begins to form), the platinum resistance thermometer can be stably used in the temperature region of the applicable oxidized form.

Here, in order to cause $PtO_2$ oxidation of the surface of the aforementioned platinum resistance wire or platinum resistance film, preferably, the applicable oxidized form is stabilized by causing sufficient $PtO_2$ oxidation the surface of the aforementioned platinum resistance wire or platinum resistance film using gas with 100% oxygen as the aforementioned gas containing oxygen.

Moreover, preferably, the temperature region of the aforementioned reduced form of platinum and the temperature region of the aforementioned $PtO_2$ form are derived using the oxidation potential phase chart of platinum based on the respective oxide formation free energies.

Further, preferably the aforementioned inert gas with oxygen of 1 kPa or less to be substituted is an inert gas containing roughly 0% or trace amounts of oxygen.

More concretely, preferably the specified highly pure inert gas that has been passed through an oxygen getter is used for the aforementioned inert gas with roughly 0% oxygen.

The present invention also offers a standard platinum resistance thermometer manufactured by the above manufacturing process.

Because purge gas containing inert gas and oxygen is enclosed in the protective tube provided with a thermosensitive part of platinum resistance wire or platinum resistance film, the temperature inside the protective tube is raised to a temperature region in which the platinum is in reduced form at a partial pressure of oxygen in the purge gas as determined from platinum oxide formation free energy, and then the aforementioned purge gas is replaced with inert gas in which oxygen is 1 kPa or less, the invention of the present application has stable characteristics with less resistance variation irrespective of temperature by increasing the purity (resistance ratio) of the platinum resistance wire or the like, conducting residual strain relief annealing of the platinum resistance wire in a clean high temperature atmosphere containing oxygen, and, once a substrate with stable resistance value has been made, by making the oxygen partial pressure of the purge gas be 1 kPa or less.

In particular, by sealing the protective tube when inert gas with 1 kPa or less of oxygen has been substituted, a highly reliable platinum resistance thermometer can be offered with less resistance value variation, satisfactory measurement reproducibility and stable performance over a broad use temperature region comprising both the oxidation and reduction regions, specifically from the low temperature region to the temperature region (high temperature region) in which the platinum is in reduced form at a partial pressure of oxygen of 1 kPa or less in the applicable purge gas as determined by the platinum oxide formation free energy.

Moreover, instead of sealing the protective tube when inert gas with 1 kPa or less of oxygen has been substituted as stated above, by reducing the temperature inside the protective tube, which has purge gas substituted by the aforementioned inert gas, to the temperature region of the $PtO_2$ oxidation form as determined by the platinum oxide formation free energy of the applicable oxygen partial pressure, then by causing sufficient $PtO_2$ oxidation of the surface of the aforementioned platinum resistance wire or platinum resistance film, and by further sealing the aforementioned protective tube with the oxygen partial pressure of the aforementioned purge gas adjusted to the partial pressure such that the use temperature region of the applicable platinum resistance thermometer falls within the temperature region of the aforementioned oxidation form of $PtO_2$, a platinum resistance thermometer can be offered that has no PtO form change and that can be stably used with less resistance value variation in the temperature region of the applicable oxidized form.

The temperature region of the reduced form of platinum and the temperature of the $PtO_2$ form can be effectively determined using the platinum oxidation potential phase chart based on the respective oxide formation free energies.

More preferably, by taking an inert gas with roughly 0% or trace amounts (partial pressure of about 10 Pa or less) of oxygen as the inert gas to be substituted in which oxygen is 1 kPa or less, a platinum resistance thermometer with a more stable resistance value can be offered when sealing the protective tube with the applicable substitution gas. In the above cases in which further oxidation is conducted prior to sealing, the oxidation reaction speed is suppressed in the PtO region when lowering the temperature to the oxidation temperature, and therefore the production of PtO is suppressed and oxidation as pure $PtO_2$ can be conducted, which can stabilize the resistance value.

Moreover, inert gas with roughly 0% oxygen can be effectively obtained by further passing highly pure inert gas containing 0.2 ppm to several ppm of oxygen through an oxygen getter such as a sponge titanium.

BEST MODE FOR CARRYING OUT THE INVENTION

Next, embodiments of the present invention will be explained in detail based on the attached drawings.

Figure 11:
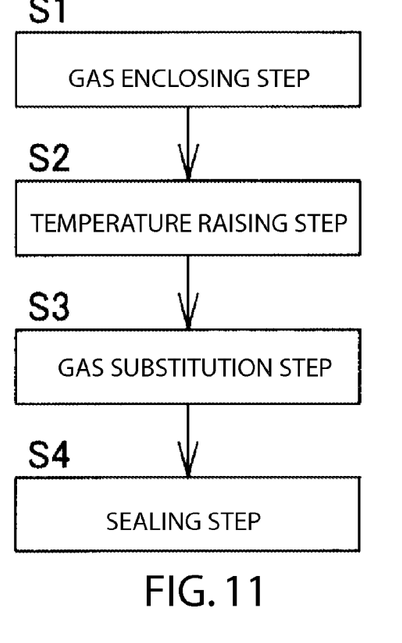
FIG. 11 is a flowchart indicating the order of manufacturing the first embodiment.
Figure 12:
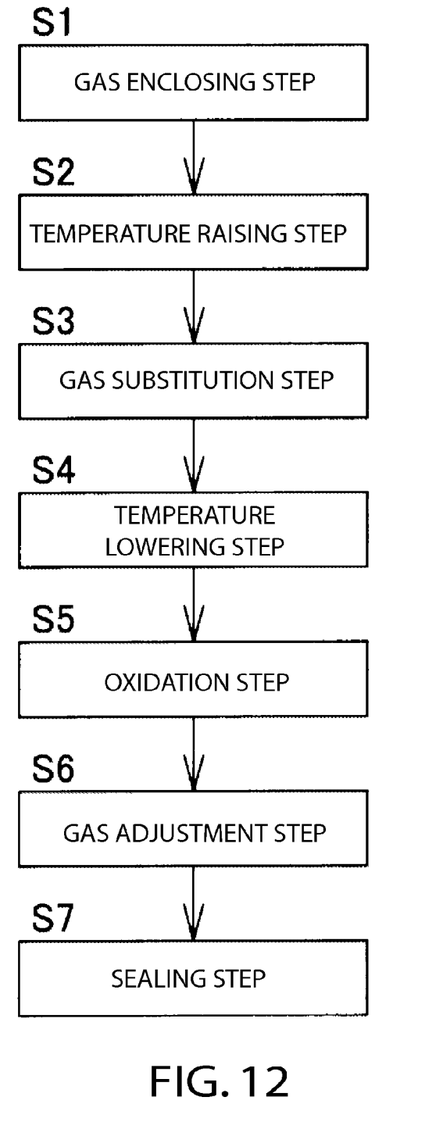
FIG. 12 is a flowchart indicating the order of manufacturing the second embodiment.

FIG. 11 is a step chart indicating the order of manufacturing Example 1; FIG. 12 is a step chart indicating the order of manufacturing Embodiment 2; and FIG. 13 indicates the structure of representative platinum resistance thermometer as used in the past. Further, in the embodiments below, an explanation is given of an example of a platinum resistance thermometer with a structure comprising a thermosensitive part with a single coil winding formed in a coil shape by winding straight platinum resistance wire 20 on cross-shaped reel 4 as indicated in FIG. 13, but the structure of the platinum resistance thermometer of the present invention is not limited to this, and a variety of structures well-known in the past may be adopted, for example, a structure in which coil-shaped platinum wire inserted in 2 spiral-shaped quartz tubules, or a structure that has a double coil type thermosensitive part in which coil-shaped platinum resistance wire is wound in a coil shape in grooves formed on a cross-shaped quartz reel.

Instead of providing platinum resistance wire, the thermosensitive part may be configured by vapor deposition formation of a platinum resistance film, or the like. As long as there is a structure in which the thermosensitive part comprising platinum resistance wire or platinum resistance film is provided in a protective tube and purge gas is sealed in, any structure is acceptable. The materials used in the past for the materials of the configurational members (protective tube and the like) may be broadly adopted, and are not particularly limited in regard to use such as for standard, quasi-standard, or industrial use. The inert gas used in the purge gas is not particularly limited, and argon, nitrogen, helium or neon can be suitably used. First, the process of manufacturing the platinum resistance thermometer related to a first embodiment will be explained based on FIG. 11 and FIG. 13.

The process for manufacturing the present embodiment at least comprises a gas enclosing step Si of enclosing a purge gas G containing inert gas and oxygen in a protective tube 3 provided with a thermosensitive part 2 composed of a platinum resistance wire 20; a temperature-raising step S2 of raising the internal temperature of the protective tube 3 to the temperature region in which the platinum is in reduced form at a partial pressure of the oxygen in the aforementioned purge gas G as determined by the platinum oxide formation free energy; a gas substitution step 3 of substituting the aforementioned purge gas G with inert gas in which oxygen is 1 kPa or less; and a sealing step 4 of sealing the protective tube 3 in this substituted state. The present embodiment is thereby capable of being stably used in the temperature region in which the platinum is in reduced form at a oxygen partial pressure of 1 kPa or less as determined by the platinum oxide formation free energy.

A suitable amount of oxygen is included in the purge gas from the gas enclosing step S1 to the temperature-raising step S2 in order to oxidize and remove impurities adhering to the various parts in the protective tube, and to the surface of the platinum resistance wire in particular, and after the temperature-raising step S2 is complete the oxygen concentration is adjusted by substituting with the aforementioned inert gas in which the oxygen partial pressure is 1 kPa or less. In the temperature-raising step S2, the temperature is raised to the Pt reduction temperature region based on the previously described oxygen partial pressure of the purge gas that has been enclosed and on the aforementioned platinum oxide formation free energy as determined by the platinum potential phase chart. As the aforementioned impurities are removed under a clean high temperature atmosphere containing oxygen, oxygen is removed and reduced from the oxides on the surface of the platinum resistance wire, which is turned into clear platinum wire. At the same time, the resistance ratio of the platinum resistance wire is raised based on the effect as residual strain relief annealing of the platinum resistance wire, which is conducted in order to increase the so-called "purity" of the platinum wire. The steps from the gas enclosing step S1 to the temperature-raising step S2 may be repeated multiple times. Moreover, a more preferable embodiment conducts pre-processing by repeatedly conducting annealing and gas substitution at a lower temperature at a stage prior to the gas enclosing step S1 for the temperature-raising step S2.

Then, after the temperature-raising step S2 is completed, substitution with the substitution gas for final enclosure is conducted at the gas substitution step S3, and in the present invention, by keeping the oxygen partial pressure of this substitution gas to 1 kPa or less, a platinum resistance thermometer can be obtained with less resistance value variation and high reproducibility even when used in both the oxidation and reduction temperature ranges. The oxygen partial pressure is preferably set to a trace amount, concretely, to 10 Pa or less, more preferably to 1 Pa or less, and even more preferably to 0.1 Pa or less; most desirably, the oxygen partial pressure is set to an oxygen concentration of roughly 0% obtained by passing the specified highly pure inert gas though an oxygen getter.

Next, the process for manufacturing a platinum resistance thermometer related to a second embodiment will be explained based on FIG. 12 and FIG. 13.

The process for manufacturing the present embodiment at least comprises a gas enclosing step S1 of enclosing a purge gas G containing inert gas and oxygen in a protective tube 3 provided with a thermosensitive part 2 composed of a platinum resistance wire 20; a temperature-raising step S2 of raising the internal temperature to the temperature region in which the Pt is in reduced form at a partial pressure of the oxygen in the aforementioned purge gas G as determined by the platinum oxide formation free energy; a gas substitution step 3 of substituting the aforementioned purge gas G with inert gas in which oxygen is 1 kPa or less; a temperature lowering step S4 of lowering the internal temperature of the protective tube with the substituted purge gas G to the temperature region of the oxidized form of $PtO_2$ in which the partial pressure of the oxygen in the aforementioned purge gas G is 1 kPa or less as determined by the platinum oxide formation free energy; an oxidation step S5 of causing $PtO_2$ oxidation on the surface of the platinum resistance wire 20 based on the purge gas G containing oxygen; a gas adjusting step S6 of adjusting the oxygen partial pressure of the purge gas G to a partial pressure such that the use temperature region of the applicable platinum resistance thermometer 1 falls within the temperature region of aforementioned oxidized form of $PtO_2$; and a sealing step 7 of sealing the protective tube 3 in this oxygen partial pressure adjusted state. In the present the embodiment, in the same way as in the above first embodiment, an order was adopted in which, after the purity is increased by raising the temperature to the reduction region in a gas atmosphere containing oxygen, eliminating the impurities adhering to the platinum wire, and reducing the PtO, etc. on the surface and conducting residual strain relief annealing, the temperature is decreased to the $PtO_2$ [region] in a form with the oxygen partial pressure set low in order as much as possible not to produce PtO on the surface of the platinum wire in the PtO region, through which the process passes when lowering the temperature to the $PtO_2$ region. Concretely, at the gas substitution step S3 after raising the temperature, the purge gas is replaced with gas with a low oxygen content in which the oxygen partial pressure is 1 kPa or less, and the temperature is lowered in that state. With the oxygen partial pressure as low as possible at this time, it is possible to pass rapidly through the PtO region, and the oxygen partial pressure is preferably set to a trace amount, concretely, to 10 Pa or less, more preferably to 1 Pa or less, and even more preferably to 0.1 Pa or less; most desirably, the oxygen partial pressure is set to an oxygen concentration of roughly 0% obtained by passing the specified highly pure inert gas though an oxygen getter.

In the temperature lowering step S4, the $PtO_2$ region is determined by the platinum oxidation potential phase chart based on the oxygen partial pressure of the previously described low oxygen content gas that was replaced and on the oxide formation free energy, and preferably cooling is conducted such that the temperature lowering rate is rapid allowing quicker passage through the PtO region. Then in the oxidation step S5, with the temperature lowered to the $PtO_2$ region, high oxygen concentration purge gas is substituted and the surface of the platinum wire is allowed to sufficiently oxidize, and preferably the gas used at that time has an oxygen concentration of nearly 100%.

Then, in the final gas adjustment step S6 prior to sealing, as opposed to the aforementioned first embodiment, the oxygen partial pressure in the purge gas is not set to 1 kPa or less, but rather it is necessary to set the oxygen partial pressure of the purge gas to greater than 1 kPa in order to make a partial pressure such that the use temperature region falls within the aforementioned $PtO_2$ region (does not change form to PtO). For example, if making the use region a temperature region from low temperature to near 300° C., the oxygen partial pressure as determined from the platinum oxidation potential phase chart indicated in FIG. 1 is adjusted to about 10 kPa or more.

An embodiment of the present invention was described above, but the present invention is not at all limited by this embodiment, and of course a variety of forms that are within the range that does not deviate from the intention of the present invention may be implemented.

EXAMPLES

Experiment 1

An experiment was conducted to investigate the oxidation-reduction characteristics in the high temperature region using a platinum resistance thermometer of Example 1 produced by the manufacturing process of the first embodiment above and a platinum resistance thermometer of Comparative Example 1, in which only the oxygen partial pressure was modified. The oxygen partial pressure of Example 1 was a trace amount of approximately 0.1 Pa, and the oxygen partial pressure of Comparative Example 1 was 4 kPa at room temperature. The reduction and annealing prior to gas substitution was conducted at a temperature of 670° C. for 10 hours. In Example 1 highly pure argon (oxygen partial pressure of approximately 0.1 Pa) was substituted as the purge gas, and Comparative Example 1 was adjusted such that the oxygen partial pressure was 4 kPa at room temperature, and such that together with argon the total pressure was approximately 100 kPa or less at 900° C. and approximately 25 kPa at room temperature.

Figure 4:
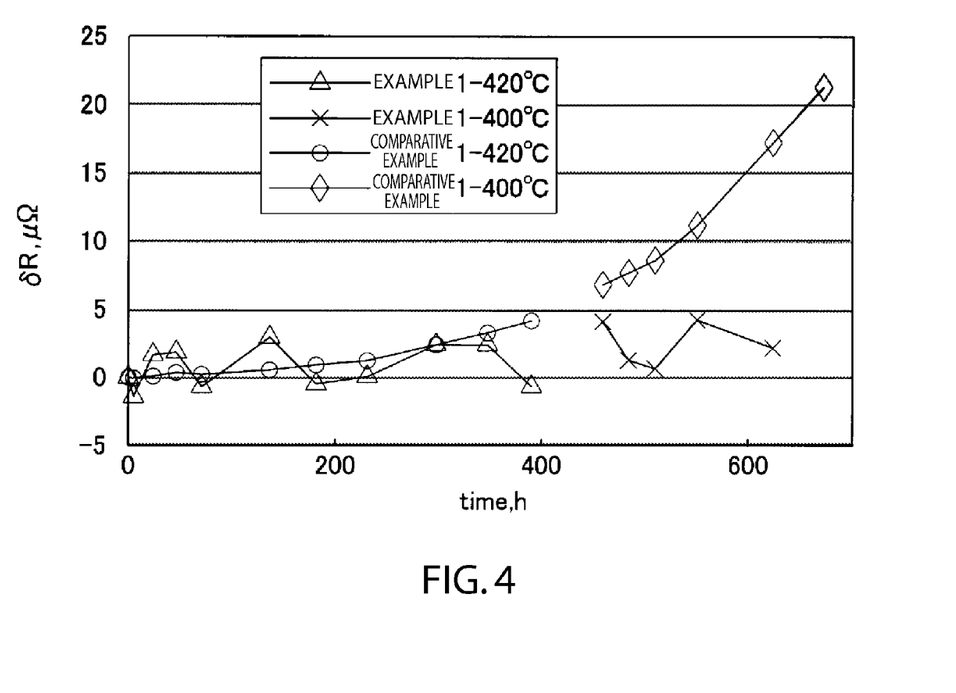
FIG. 4 is a graph indicating the results of measuring the resistance values while maintaining Example 1 and Comparative Example 1 at 420° C. for 100 hours or more, and at 400° C. for 100 hours or more.

First, the platinum resistance thermometers were maintained at 420° C. for 100 hours or more, and at 400° C. for 100 hours or more, and periodically were cooled to room temperature to measure the resistance values of temperatures at the triple point of water. The measurement results are indicated in FIG. 4. In Comparative Example 1 (4 kPa), there was an increase of resistance value in conjunction with the time of exposure at 420° C. and 400° C. As is evident from the oxidation potential phase chart in FIG. 1, $\Delta G_{PtO}(T,p)$ is negative in this temperature region, and the $O_2$ in the sheath is consumed and PtO spreads into the platinum wire. Meanwhile, in Example 1 (approximately 0.1 Pa), the resistance values at 420° C. and 400° C. were within about 1 mK and were maintained at a constant level. At the oxygen partial pressure of approximately 0.1 Pa, the $\Delta G_{PtO}$ and the $\Delta G_{PtO2}$ are both positive at 420° C. and 400° C., and the platinum wire does not oxidize. The different results of these two platinum resistance thermometers indicate that the oxygen partial pressure in the sheath greatly contributes to the variations of resistance value, and demonstrate that an oxygen partial pressure of approximately 0.1 Pa is extremely stable in relation to oxidation, and is suitable for precision measurements in the temperature region of 400° C. or more.

Figure 5:
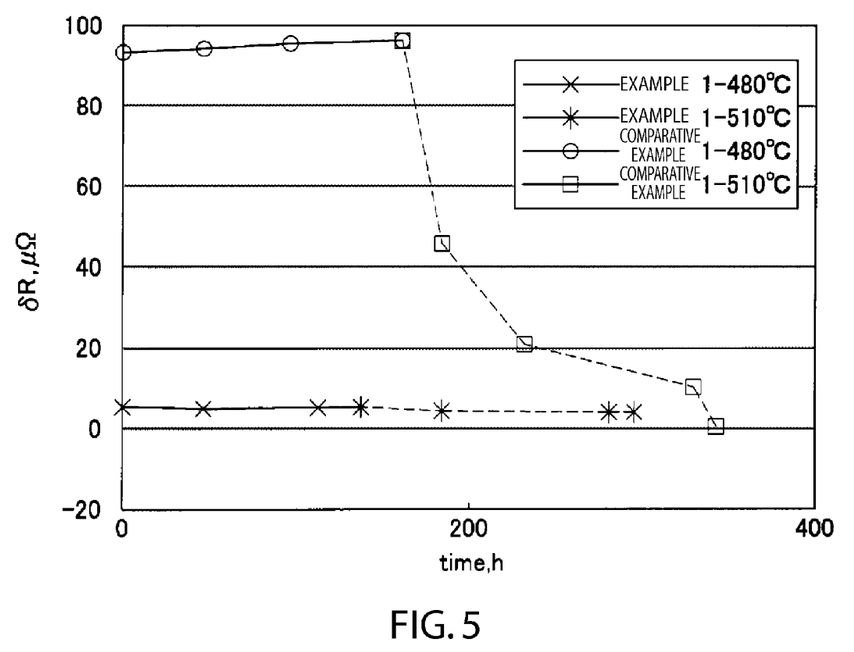
FIG. 5 is a graph indicating the results of measuring the resistance values after using Example 1 and Comparative Example 1 for 1000 hours or more in the temperature region of 230 to 420° C., and then causing isothermal reduction at 480° C. and 510° C.

Next, after measuring the aforementioned resistance values of oxidation characteristics, and after having used Example 1 (approximately 0.1 Pa) and Comparative Example 1 (4 kPa) for 1000 hours or more in the 230 to 420° C. temperature range, isothermic reduction was measured at 480° C. and 510° C. The results of isothermic reduction are indicated in FIG. 5. In Comparative Example 1, in the oxidation potential phase chart the $\Delta G_{PtO}(T)$ at 480° C. nearly traverses the line $\Delta G_{PtO}(T)=0$, the resistance value is nearly constant as indicated in FIG. 5, and PtO and Pt are in equilibrium. However, at 510° C., $\Delta G_{PtO}(T)$ becomes >0, and it is clear that reduction of PtO causes a rapid decrease in resistance value. Meanwhile, the resistance value of Example 1 is constant at 480° C. and 510° C. The results of Experiment 1 above demonstrate that there are large resistance value variations caused by oxidation and reduction in the platinum resistance thermometer in which the oxygen partial pressure is 4 kPa, but the platinum resistance thermometer with the low oxygen partial pressure of approximately 0.1 Pa is stable at any temperature.

Experiment 2

Figure 6:
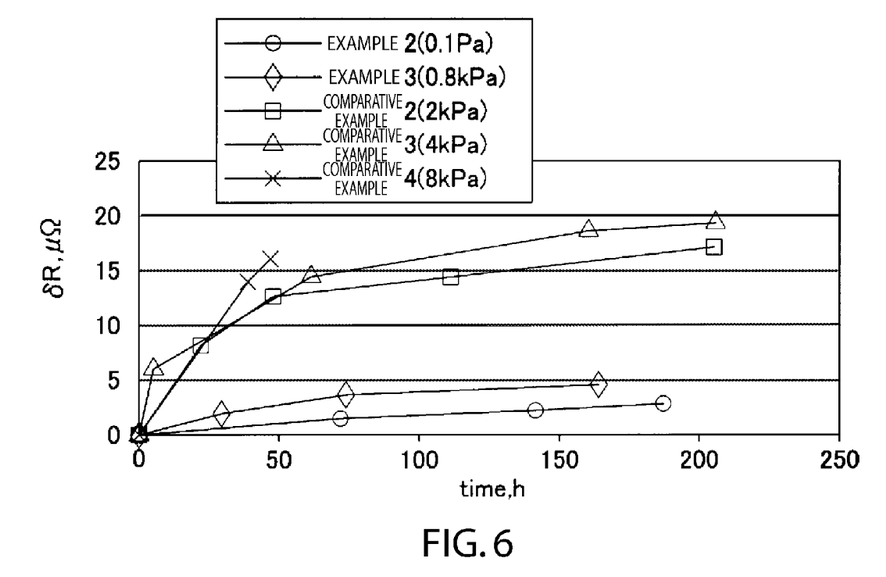
FIG. 6 is a graph indicating the results of measuring resistance value variations of Embodiments 2, 3 and Comparative Examples 2 to 4 at 230° C.

Next, an experiment was conducted to investigate the isothermic oxidation characteristics using example and comparative platinum resistance thermometers manufactured following the above manufacturing method of the first embodiment and set to multiple and more detailed final adjustments of the oxygen partial pressures. Using 5 types of platinum resistance thermometer with differing oxygen partial pressures, Example 2 (approximately 0.1 Pa), Example 3 (0.8 kPa), Comparative Example 2 (2 kPa), Comparative Example 3 (4 kPa), and comparative Example 4 (8 kPa), reduction and annealing prior to the respective gas substitutions was conducted at a temperature of 670° C. for 10 hours. The numeric values in parentheses of the various platinum resistance thermometers are the respective oxygen partial pressures at room temperature. FIG. 6 indicates the results of measuring the resistance value variations of the platinum resistance thermometers at 230° C., and FIG. 7 indicates the results of measuring the resistance value variations of the platinum resistance thermometers (except for Comparative Example 4) at 420° C.

Figure 7:
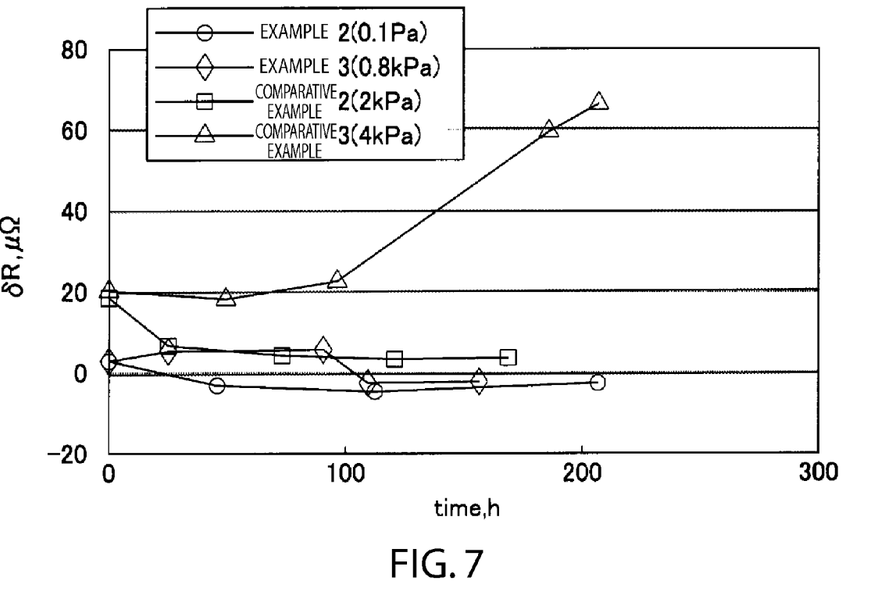
FIG. 7 is a graph indicating the results of measuring resistance value variations of Embodiments 2, 3 and Comparative Examples 2, 3 at 420° C.

As indicated in FIG. 6, in low oxygen partial pressures such as Example 2 (approximately 0.1 Pa) and Example 3 (0.8 kPa) drift at 230° C. was comparatively small, but Comparative example 2 (2 kPa), Comparative Example 3 (4 kPa) and Comparative Example 4 (8 kPa) were not stable even at the low temperature of 230° C. Specifically, Comparative Example 3 (4 kPa) and Comparative Example 4 (8 kPa) exhibited large resistance variations of 60 mK or more. Meanwhile, as indicated in FIG. 7, it was demonstrated that low oxygen partial pressures such as Example 2 (approximately 0.1 Pa) and Example 3 (0.8 kPa) were stable even at 420° C. Comparative Example 2 (2 kPa) was comparatively stable at 420° C., but resistance value drift was observed at 230° C. This fact indicates that the oxygen partial pressure is extremely sensitive to oxidation. This demonstrates that the oxygen partial pressure must be adjusted according to the temperature region to be used, and that a platinum resistance thermometer capable of all temperature ranges must adjusted to a low oxygen partial pressure of 1 kPa or less.

As demonstrated by Experiments 1 and 2, inasmuch as resistance value drift of platinum resistance thermometers depends on the chemical reactions of $PtO_2$ and PtO, which are controlled by the oxide formation free energy, platinum resistance thermometers with a high oxygen partial pressure indicate large resistance value variations when used at 400° C. or more. Meanwhile, platinum resistance thermometers with a low oxygen partial pressure, for example 1 kPa or less, are stable in relation to oxidation as long as the platinum wire is not contaminated. In conclusion, the oxygen in the sheath should be lower than 1 kPa, and if used in a broad temperature region, preferably should be conducted by reduction to the reduction region of 600° C. or more for every measurement.

Experiment 3

Figure 8:
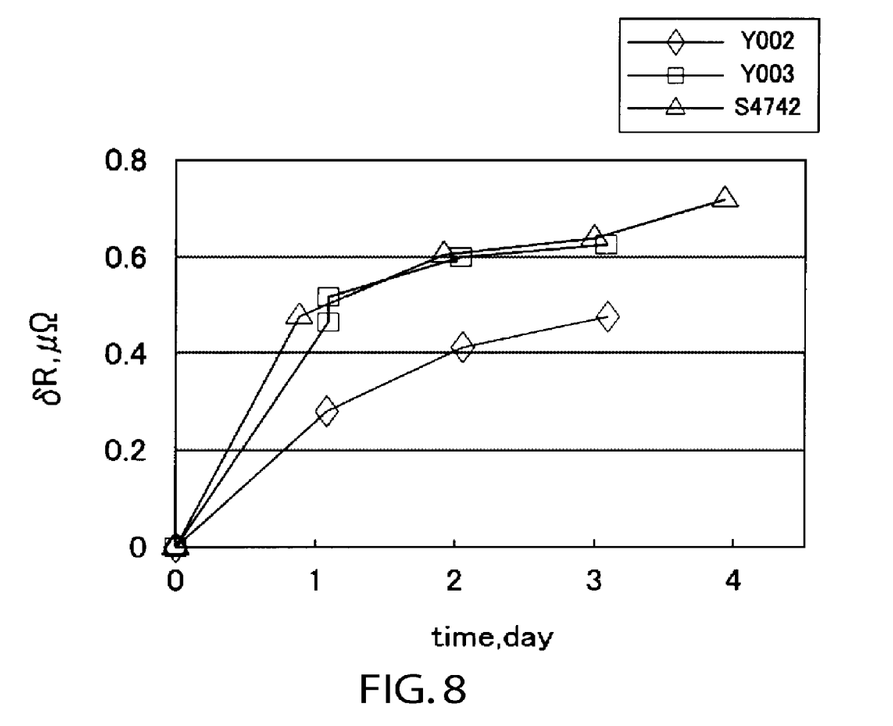
FIG. 8 is a graph indicating the results of measuring resistance value variations of platinum resistance thermometers at 100° C.
Figure 9:
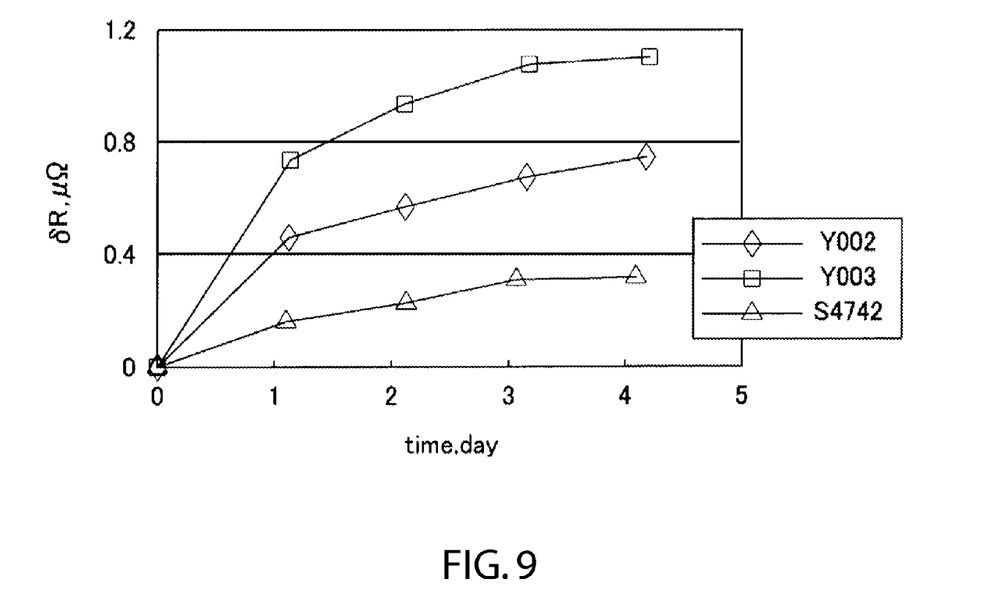
FIG. 9 is a graph indicating the results of measuring resistance value variations of platinum resistance thermometers at 150° C.

Next, an experiment was conducted regarding stability based on sufficient oxidation. First, after an experiment was conducted to investigate the oxidation characteristics in the low temperature region using three types of platinum resistance thermometers, Y002 (2 kPa), Y003 (2 kPa), and S4742 (8 kPa), and then reducing each at 650° C. for approximately 15 hours, the temperature was maintained at 100° C. and 150° C. for 3 to 4 days. The resistance values of the platinum resistance thermometers were periodically measured at the triple point of water. FIG. 8 indicates the results of measuring the resistance value variations of the platinum resistance thermometers at 100° C., and FIG. 9 indicates the results of measuring the resistance value variations of the platinum resistance thermometers at 50° C. The resistance values indicated gradual drift following the $PtO_2$ curve in FIG. 1. It may be inferred from these resistance value variations that several layers of oxidized platinum were on the surface of the platinum wire. However, the resistance values continually increased, and the oxidation layers expanded.

Figure 10:
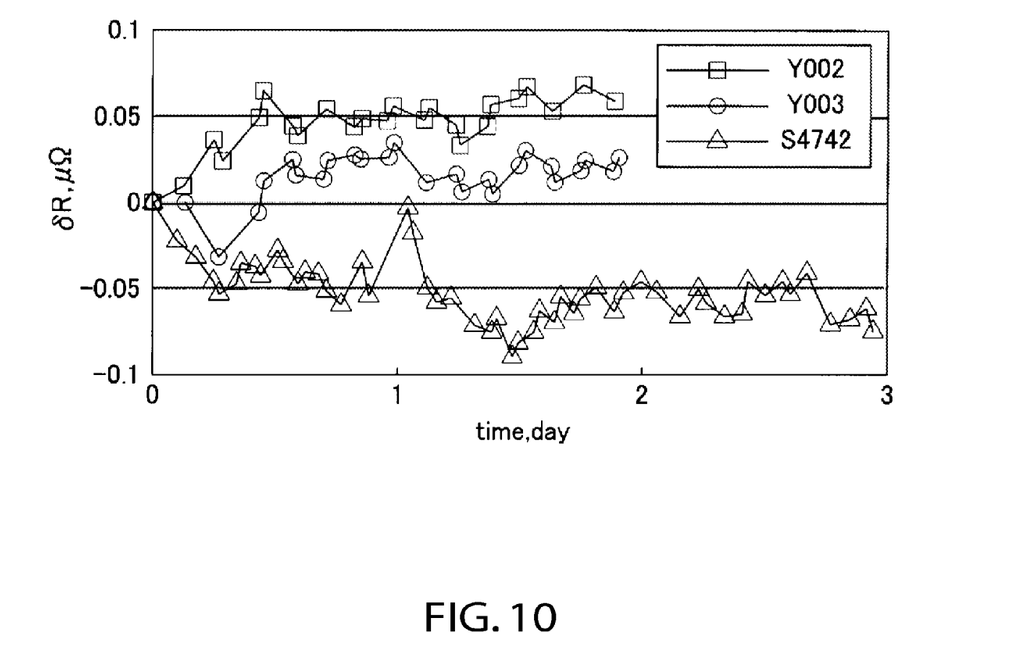
FIG. 10 is a graph indicating the results of maintaining platinum resistance thermometers at 420° C. for approximately 15 hours, afterwards cooling in order to cause full oxidation of the platinum wire, and then measuring resistance values.

According to the oxidation potential phase diagram, resistance value drift of the platinum resistance thermometers caused by oxidation of platinum cannot be avoided, but drift caused by oxidation is not that rapid at room temperature. If the platinum resistance thermometer can be controlled to a given oxidation state, then stability could probably be guaranteed over a long period in a limited temperature use region. From this perspective, the stability of sufficiently oxidized platinum wire was measured. The results are indicated in FIG. 10. In this experiment, the aforementioned 3 platinum resistance thermometers were maintained at 420° C. for approximately 15 hours, and afterwards were slowly cooled at a rate of about −20° C./h in order to cause sufficient oxidation of the platinum wire. Next, the resistance values at the triple point of water were measured. Drift was observed for the first several hours, but afterwards the resistance stabilized. The results of Experiment 3 demonstrate that platinum wire that has been sufficiently oxidized is comparatively stable, and if in the aforementioned $PtO_2$ oxidized form in the temperature region of use, the platinum resistance thermometer can be stably used even at a partial pressure of 1 kPa or more.

The invention claimed is:

1. A process for manufacturing a platinum resistance thermometer provided with a thermosensitive part composed of platinum resistance wire or platinum resistance film in a protective tube, comprising the steps of:
   enclosing a purge gas containing a first inert gas and oxygen in the protective tube provided with the thermosensitive part composed of platinum resistance wire or platinum resistance film;
   raising the temperature inside the protective tube to a temperature region in which the platinum is in reduced form at a partial pressure of oxygen in said purge gas as determined from platinum oxide formation free energy; and
   substituting said purge gas with a second inert gas in which oxygen is 1 kPa or less.

2. The process for manufacturing a platinum resistance thermometer according to claim 1, further comprising the steps of: sealing said protective tube after said second inert gas has been substituted, such that the thermometer can be stably used to the temperature region at which the platinum is in reduced form at a partial pressure said oxygen at 1 kPa or less as determined from platinum oxide formation free energy.

3. The process for manufacturing a platinum resistance thermometer according to claim 1, further comprising the steps of taking a gas containing oxygen as said purge gas and causing sufficient $PtO_2$ oxidation of the surface of said platinum resistance wire or platinum resistance film; and sealing said protective tube with the partial pressure of the oxygen in said purge gas adjusted to a partial pressure such that the use temperature region of the applicable platinum resistance thermometer falls within the temperature region of said oxidized form of $PtO_2$, whereby the thermometer can be stably used in the temperature region of the applicable oxidized form by lowering the internal temperature of the protective tube, with the purge gas having been substituted with said second inert gas, to the temperature region of the oxidized form of $PtO_2$, in which the partial pressure of the oxygen in said purge gas is 1 kPa or less as determined from the platinum oxide formation free energy.

4. The process for manufacturing a platinum resistance thermometer according to claim 3 in which said purge gas containing oxygen, is a gas of 100% oxygen in order to cause $PtO_2$ oxidation the surface of said platinum resistance wire or platinum resistance film.

5. The process for manufacturing a platinum resistance thermometer according to claim 4, further comprising the steps of: sealing said protective tube after said second inert gas has been substituted, such that the thermometer can be stably used to the temperature region at which the platinum is in reduced form at a partial pressure said oxygen at 1 kPa or less as determined from platinum oxide formation free energy.

6. The process for manufacturing a platinum resistance thermometer according to claim 1 wherein said temperature region of platinum in reduced form and said temperature region in $PtO_2$ form are determined as a function of respective oxide formation free energies.

7. The process for manufacturing a platinum resistance thermometer according to claim 6, further comprising the steps of: sealing said protective tube after said second inert gas has been substituted, such that the thermometer can be stably used to the temperature region at which the platinum is in reduced form at a partial pressure said oxygen at 1 kPa or less as determined from platinum oxide formation free energy.

8. The process for manufacturing a platinum resistance thermometer according to claim 1 wherein said first inert gas with oxygen of 1 kPa or less that is substituted is an inert gas with roughly 0% or trace amounts of oxygen.

9. The process for manufacturing a platinum resistance thermometer according to claim 8, wherein a substance obtained by passing a specified highly pure inert gas through an oxygen getter is used as said first inert gas in which oxygen is roughly 0%.

10. A platinum resistance thermometer manufactured by of the manufacturing process according to claim 1.

* * * * *